No. 841,396. PATENTED JAN. 15, 1907.
F. W. HOEFER.
MACHINE FOR THREADING PIPES.
APPLICATION FILED OCT. 14, 1905.

3 SHEETS—SHEET 1.

Witnesses:
G. A. Rauberschmidt
Nellie E. Emmett

Inventor
Frederick W. Hoefer
By W. W. Morrison
Atty

Inventor: Frederick W. Hoefer

No. 841,396. PATENTED JAN. 15, 1907.
F. W. HOEFER.
MACHINE FOR THREADING PIPES.
APPLICATION FILED OCT. 14, 1905.
3 SHEETS—SHEET 3.
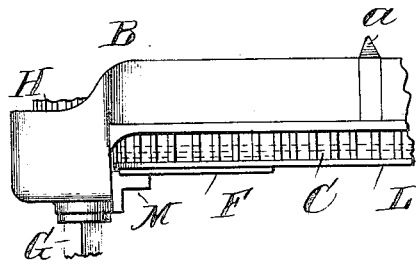
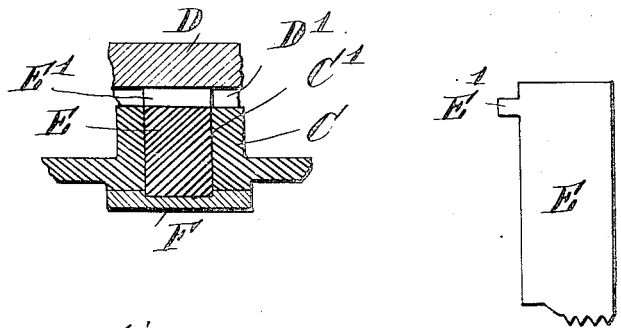
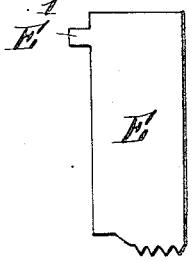
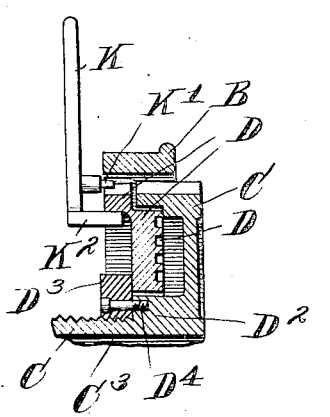
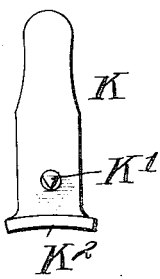
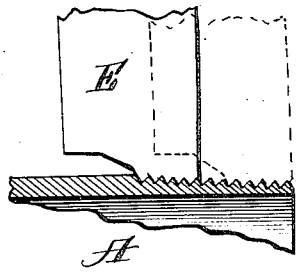
Witnesses.
Inventor:
Frederick W. Hoefer,
By
Atty

UNITED STATES PATENT OFFICE.

FREDERICK W. HOEFER, OF FREEPORT, ILLINOIS, ASSIGNOR TO HOEFER MANUFACTURING COMPANY, OF FREEPORT, ILLINOIS.

MACHINE FOR THREADING PIPES.

No. 841,396.                Specification of Letters Patent.                Patented Jan. 15, 1907.

Application filed October 14, 1905. Serial No. 282,850.

*To all whom it may concern:*

Be it known that I, FREDERICK W. HOEFER, a citizen of the United States of America, residing at Freeport, in the county of Stephenson and State of Illinois, have invented certain new and useful Improvements in Machines for Threading Pipes, of which the following is a specification.

This invention relates to a machine for exteriorly threading pipes and rods. Its object is to produce such a machine that will cut threads increasing in diameter as they extend inward from the end of the pipe, thereby leaving the end portion of the pipe after it is threaded tapering toward its threaded end; and it consists of certain new and useful features of construction and combinations of parts specially devised to that end, all as hereinafter fully described, and specifically pointed out in the claims appended hereto.

Figure 1:
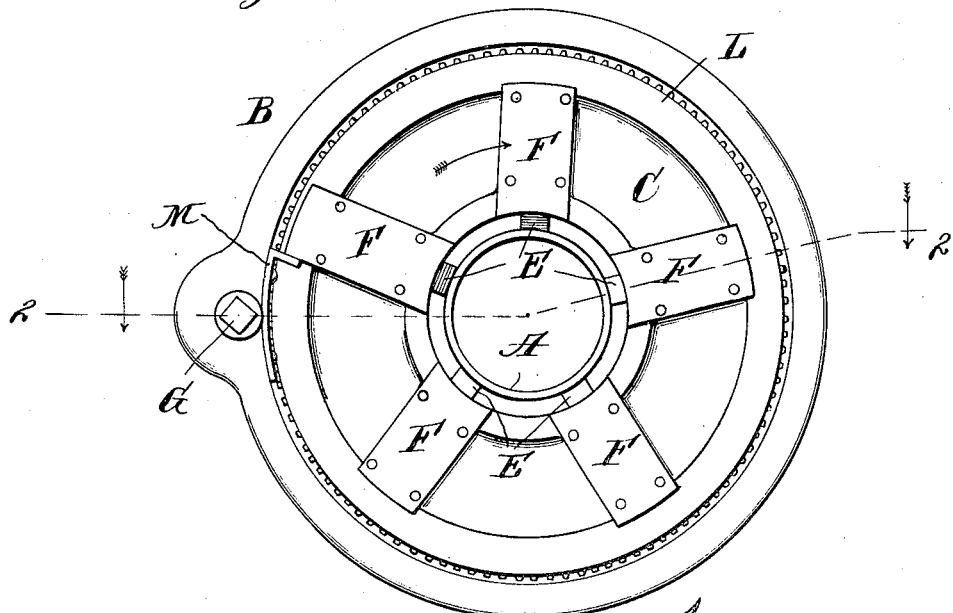
Figure 2:
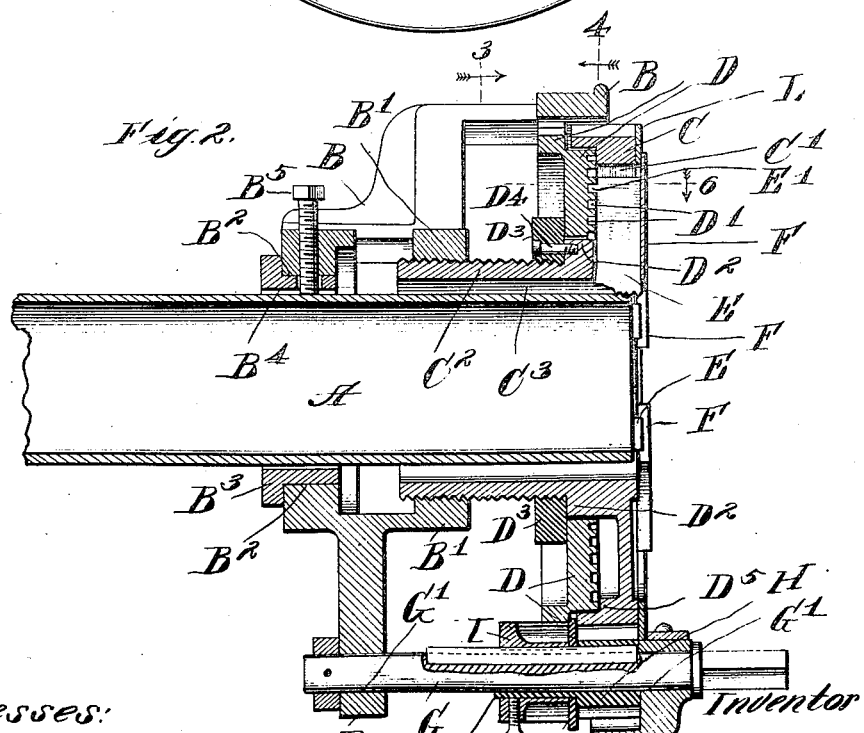
Figure 3:
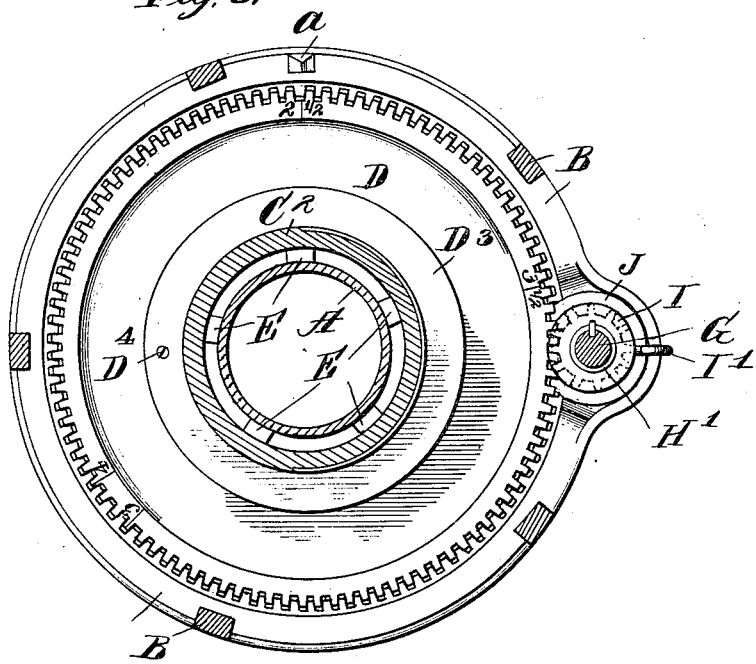
Figure 4:
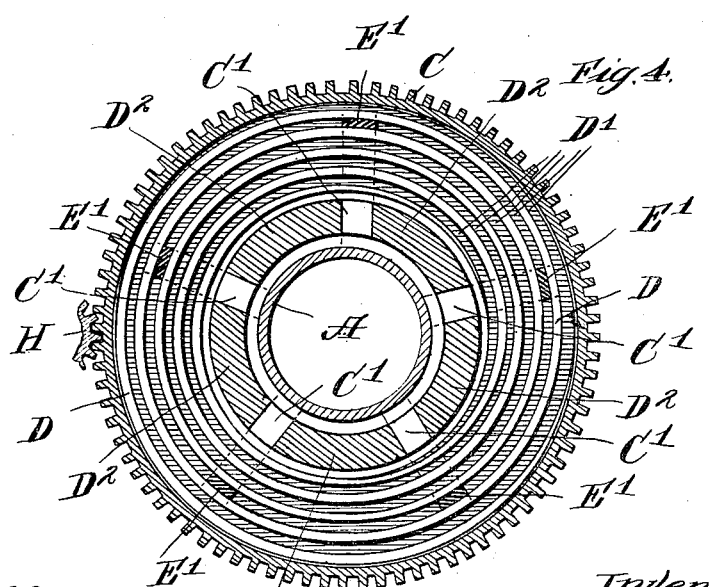

Referring to the accompanying drawings, which form a part of this specification, Figure 1 is a face or front end elevation of a machine embodying my invention. Fig. 2 is a section at the dotted line 2 2 in Fig. 1 of parts there shown. Fig. 3 is a section at the dotted line 3 3 in Fig. 2 of parts there shown. Fig. 4 is a section at the dotted line 4 4 in Fig. 2 of parts there shown. Fig. 5 is a section broken from the machine and showing certain parts in detail. Fig. 6 is a section at the dotted line 6 in Fig. 2 of parts there shown. Fig. 7 is one of the threading-dies of the machine. Fig. 8 is a sectional detail of the machine, showing the wrench for rotating the cam-disk thereof operatively connected therewith. Fig. 9 is a wrench for rotating the cam-disk of the machine to radially adjust its dies preparatory to cutting threads on pipes of different diameter. Fig. 10 is a diagrammatic view illustrating the operation of the dies of the machine and indicating in a general way the taper of a thread cut on a pipe thereby.

Like letters of reference indicate corresponding parts throughout the several views.

A is a pipe held firmly clamped in a steamfitter's vise (not shown) or by other suitable clamping means.

B is the machine-frame, provided with an interiorly-threaded centrally-located circular bearing B' and a preferably circular aperture B², concentric with the bearing B' and located at the rear portion of the frame. The frame B is formed, preferably, integrally by casting.

B³ is a collar adapted exteriorly to enter and fit the interior of the aperture B² in the frame B and provided with a bore B⁴ of any desired caliber, according to the size of the pipe to be threaded.

B⁵ is a set-screw, any desired number of which may be employed to rigidly clamp the frame B to the pipe to be threaded.

C is a peripherally-toothed die-head having radial die-recesses C' therein and provided with a sleeve-hub C², threaded exteriorly to correspond with the interiorly-threaded bearing B' and bored at C³ to admit therethrough the pipe to be threaded.

D is a peripherally-toothed disk, in this instance of less diameter than the die-head C, having a spiral cam-groove D' in the outer face thereof and rotatably and concentrically mounted on the annular flange D² on the hub C² of the die-head C. The disk D will be hereinafter referred to as a "cam-disk" for brevity.

D³ is a ring, threaded interiorly and turned onto the threaded portion of the sleeve-hub C² until it abuts the annular flange D² thereon, whereto it is secured by means of a screw D⁴. The ring D³ and shoulder D⁵, Fig. 2, on the die-head C, while leaving the cam-disk free to rotate on its bearing, jointly cause the cam-disk to participate in all movements of the die-head C toward and from its bearing B'.

E represents threading-dies, housed and longitudinally slidable in the recesses C' in the die-head C and provided with actuating-lugs E', projecting therefrom into engagement with the spiral groove D' in the cam-disk D.

F represents plates for slidably maintaining the dies E in their recesses C' in the die-head C.

G is a shaft mounted in bearings G' in the machine-frame B.

H is a pinion meshing with the toothed periphery of the die-head C and splined on the shaft G and provided with a laterally-extending sleeve H'.

I is a pinion, in the present embodiment of greater diameter than the pinion H, meshing with the toothed periphery of the cam-disk D and splined on the sleeve H', so as to participate in all movements of the pinion H. I prefer to rigidly secure the pinion I to the sleeve H' of the pinion H by means of a setscrew I', so that it may be readily disengaged from the cam-disk D in order that the latter may be rotated to radially adjust the dies to any particular diameter of pipe to be threaded. The pinion I has more teeth than pinion H, and therefore rotates the cam-disk faster than pinion H rotates the die-head C.

J is a disk mounted fast on the sleeve H' of the pinion H and serving to maintain the latter and the pinion I in engagement with the die-head C and cam-disk D as they travel toward and from the bearing B' during the operation of the machine.

K is a wrench for rotating the cam-disk D. In Fig. 8 it is shown operatively applied to such disk D, its stud K' being inserted between any two teeth thereof and its curved lip K² contacting the inner surface of the peripheral flange of the same.

A suitable handle, (not shown,) having a transverse rectangular socket therein to admit the squared outer end of the shaft G, is employed to operate the machine.

It will be seen that the difference in the speed of rotation of the die-head C and the cam-disk D results in relative movement between said die-head and said cam-disk, which relative movement causes a radial movement of the threading-dies E as said die-head and said cam-disk advance simultaneously along the pipe being threaded. The scroll upon the cam-disk D is wound in the direction to cause an outward or separating movement of the threading-dies during the cutting operation. The operation of the dies E just described will be clearly understood from an inspection of Fig. 10 of the drawings.

L is a flat ring secured to the outer face of the die-head C to protect its teeth from dirt and other undesirable substances.

The operation of the machine is as follows: Any pipe A to be threaded is immovably secured in a preferably horizontal position in the manner already indicated. The pinion I is loosened and slid backward out of engagement with the cam-disk D, and the wrench K is applied thereto and the same is rotated thereby until the dies E are radially adjusted to adapt them to thread the pipe A and the pinion I slid back into and secured in mesh with the cam-disk D. If the pipe A is two and one-half inches in diameter, the cam-disk D should be rotated to the position shown in Fig. 3, where the indicator a appears opposite corresponding figures marked thereon. Other numerals appear on the cam-disk D, and if it be rotated the requisite number of revolutions until any one thereof is opposite the indicator a the dies of the machine will be radially adjusted to correspond thereto. Supposing the pipe A to be two and one-half inches in diameter and the dies E to be adjusted as indicated in Fig. 3, the shaft G will then be rotated and motion thereby communicated through the pinions H I to the die-head C and cam-disk D, both of which as they are rotated will be drawn by the joint operation of the threads on the hub C² and within the bearing B' toward the latter, the dies E meanwhile being driven by their head C to cut a thread on the pipe A and simultaneously and gradually slid outward by their cam-disk D to increase the diameter of the thread, as indicated in Fig. 10. After a thread of the requisite length has been cut the die-head C is rotated in the opposite direction until the dies disengage from the thread on the pipe, when the set-screws B⁵ may be loosened and the machine disengaged from the pipe.

Having fully described my invention, what I claim as new, and desire to secure by Letters Patent, is—

1. In a machine for threading pipes, in combination, a peripherally-toothed die-head provided with threading-dies; a peripherally-toothed scroll cam-disk engaging said threading-dies, said cam-disk and said die-head having a different number of teeth; a drive-shaft; a pinion on said shaft for said die-head; and a pinion on said shaft for said cam-disk, said pinions being proportioned to rotate the die-head and scroll at different speeds.

2. In a machine for threading pipes, in combination, a frame; a die-head rotatably mounted in said frame and arranged to travel therein; threading-dies for said die-head; a scroll cam-disk mounted concentrically with said die-head and arranged to travel therewith, said cam-disk engaging said threading-dies; and means for rotating said die-head and cam-disk simultaneously at different speeds and in the same direction for giving them a traveling movement in said frame.

3. In a machine for threading pipes, in combination, a frame provided with an interiorly-threaded bearing; a die-head provided with threading-dies and with a sleeve-hub threaded exteriorly to correspond with the interiorly-threaded bearing in the frame; a scroll cam-disk rotatably mounted on the hub of the die-head concentrically therewith and engaging said threading-dies; and means for rotating said die-head and cam-disk simultaneously at different speeds and in the same direction.

In testimony whereof I have signed my name to this specification in the presence of two subscribing witnesses.

FREDERICK W. HOEFER.

Witnesses:
E. A. HOEFER,
JESSIE V. GHARET.